Feb. 5, 1924.
N. ISACHSON
HOSE CLAMP
Filed Feb. 13, 1923
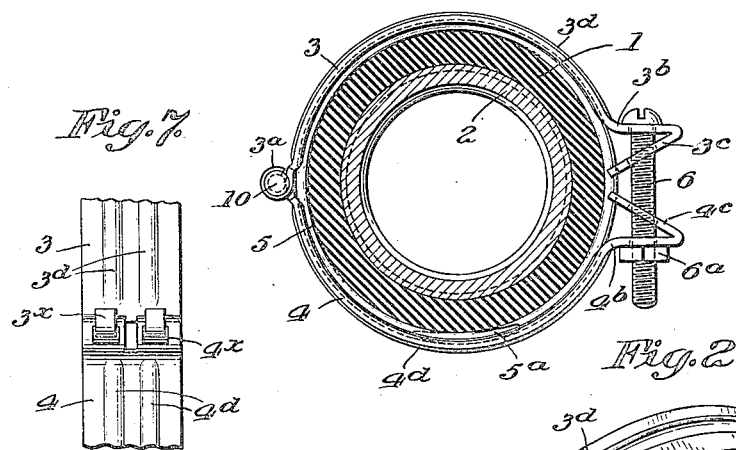
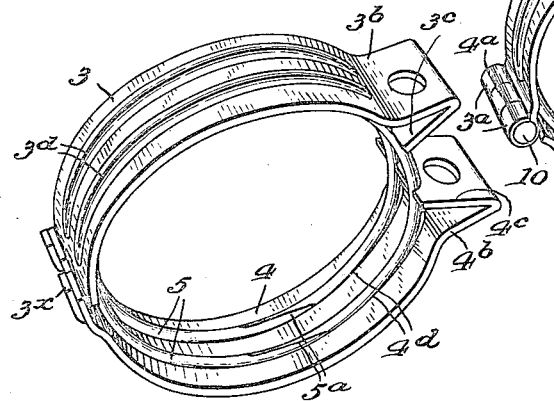
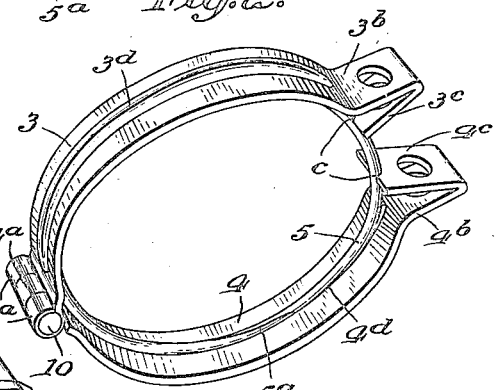
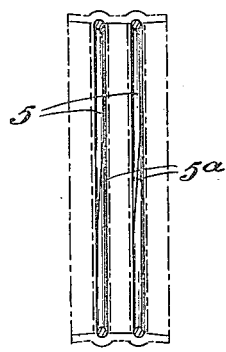
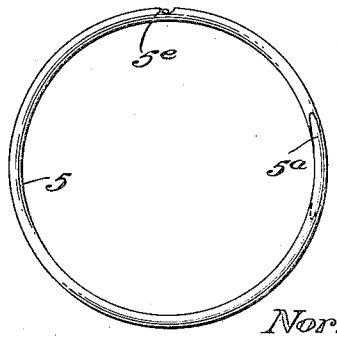
Inventor:
Norman Isachson, Patented Feb. 5, 1924.

1,482,564

UNITED STATES PATENT OFFICE.

NORMAN ISACHSON, OF ALBION, IDAHO.

HOSE CLAMP.

Application filed February 13, 1923. Serial No. 618,853.

*To all whom it may concern:*

Be it known that I, NORMAN ISACHSON, a citizen of the United States, and resident of Albion, in the county of Cassia and State of Idaho, have invented certain new and useful Improvements in Hose Clamps, of which the following is a specification.

My present invention relates to improvements in pipe clamps, and relates more particularly to clamps of the hose pipe type designed to encircle the exterior of the pipe and clamp the same upon the exterior surface of a metal sleeve, ferrule, or analogous part.

The invention aims to provide a clamp which will produce an uninterrupted binding or clamping effect upon the exterior surface of the pipe throughout its entire circumference and this without the presence of any part which will dig into the surface of the pipe or which will cause it to wrinkle up when it is of flexible material; and to so construct the clamp that it will contract evenly and equally at every point upon its circumference.

The invention further aims to provide a construction in which such uninterrupted clamping or binding effect will be brought to bear against a restricted part of the pipe while at the same time, ample strength is provided.

With these and other objects in view, the invention includes the novel features of construction and arrangement and combination of parts hereinafter described and particularly defined by the appended claims.

In order that my invention may be better understood, I have appended hereto illustrative drawings in which:—

Figure 1 is a sectional view of a pipe in place upon a sleeve or ferrule and confined in position by my improved clamp.

Fig. 2 is a perspective view of the clamp detached.

Fig. 3 is a similar view of a modification.

Figs. 4, 5 and 6, are views of modified forms of rings.

Fig. 7 is a detail of the detachable hinge of Fig. 3.

While I have shown my improved clamp as a hose clamp, it will be understood that I do not limit myself to this specific use.

Referring by reference characters to this drawing, the numeral 1 designates the hose and 2 the sleeve or ferrule upon which the same is to be clamped, and which may be the ferrule of an ordinary hose coupling, or the nipple or pipe part used in the water circulating system of a motor vehicle engine, or any other analogous part.

My improved clamp comprises a pair of substantially semi-circular sections 3 and 4 (preferably of sheet metal) adapted to embrace the pipe, and permanently hinged together at one end, preferably by forming the sections with staggered integral tongues $3^a$ and $4^a$ which are bent to form eyes or openings to receive a hinge pin 10. The free ends of these sections are bent outwardly as indicated at $3^b$ and $4^b$ and then doubled back as indicated at $3^c$ and $4^c$, the ends of the doubled back portions being notched as indicated at $c$ for a purpose which will hereinafter appear.

The sections are provided with centrally located internal grooves $3^d$ and $4^d$, which, when the members are made of sheet metal, may be formed by swaging or stamping, which grooves are designed to receive and hold a clamping, constricting, or pressure applying contracting ring 5. This ring is in the form of a round wire having overlapping ends which are preferably reversely beveled, as shown at $5^a$.

In applying my improved clamp, the wire is first applied to the hose, whereafter the sheet metal sections are placed in position with the wire aligned with and resting in the grooves. The free ends of the sections are then drawn together by means of the usual screw bolt 6 and nut $6^a$ passing through aligning openings in the doubled end portions, which causes the split ring to contract and press evenly against the hose at all points on the circumference thereof, and owing to the ring being of relatively small round wire, the pressure is applied to the pipe at a narrow or constricted area and a very firm binding action secured which results in an absolutely tight joint between the pipe and coupling member.

At the same time by the use of the metal clamping sections, I secure ring contracting parts having ample strength, both for the clamping action and to cooperate with the bolt and nut.

Preferably the inner surface of the clamping sections is flared outwardly from the grooved portions, as shown more clearly in Fig. 6, so as to cause all the pressure to be exerted directly on the ring.

The notches in the doubled back ends of the sections are designed to engage the ring and aid in contracting it at the space between the section ends, or in other words, are adapted to bridge the gap, and they not only serve to aid in constricting or contracting the wire ring, but also serve to brace the portions which receive the thrust of the bolt head and nut.

In some instances, I find it desirable to use two wire rings as illustrated in Fig. 4, in which event the clamping sections are made wider and provided with two sets of grooves, as shown.

When the clamp is designed for use in situations such that it cannot be slipped over the end of the hose, the hinge may be made detachable, as shown in Figs. 3 and 7, by forming one section (3) with hook-shaped portions 3× designed to engage corresponding eyes or openings in the other section. The wire ring may be made of two overlapping parts, or in other words, divided in two places, or it may be provided with a notched or weakened portion 5ᵉ, Fig. 5 so that when the ends of the ring are pulled far enough apart to go around the hose, the binding action will be confined to the weakened part and this will enable the ring to be readily restored to its original circular shape around the hose and prevent distortion of the ring. Instead of using a ring which is made of wire round in cross section, I may use one of non-circular form, such as indicated at 5ᶠ, Fig. 6, in which event the channel in the clamp would preferably be correspondingly modified.

It will be understood that by the use of the term "hose" I mean to include any form of pipe upon which such a clamp can be used.

By the use of a contractable annular wire ring and encircling sheet metal clamp shaped as shown, it will be seen that I provide a relatively narrow contractable member or constricting device, which presses upon the hose in a manner to secure an efficient binding action to prevent leakage, while all strain is carried by an independent and relatively wide clamping device, the groove in which serves as means for maintaining alignment, or in other words, for holding the ring centrally of the clamping means.

Having thus described my invention, what I claim is:—

1. A clamp of the character described, comprising a divided wire ring having slidably contacting overlapping ends, and a divided clamping band having a shallow internal groove to receive said ring, and means for contracting said band upon said ring.

2. A clamp of the character described comprising a divided wire ring having tapered slidably contacting overlapping ends, and a divided clamping band having a shallow internal annular groove to receive said ring, and means for contracting the band upon the ring.

3. A clamp of the character described, comprising a divided wire ring having slidably contacting overlapping ends, and a divided clamping band having a shallow internal groove to receive said ring, and means for contracting said band upon said ring, said band having the portions lying on each side of the groove flared outwardly.

4. A clamp of the character described, comprising a split wire ring having slidably contacting overlapping ends, and a clamping means cooperating therewith, comprising a pair of relatively wide sections of substantially semi-circular shape having internal shallow wire receiving grooves, said sections having two of their ends pivotally connected together, and means adjustably connecting the other ends.

5. A clamp of the character described, comprising a split wire ring having overlapping ends, and a clamping means cooperating therewith, comprising a pair of relatively wide sections of substantially semi-circular shape having internal shallow wire receiving grooves, said sections having two of their ends pivotally connected together, the other ends being provided with outwardly extended portions or wings, said wings having inwardly extending portions extending at an angle to the wings, and forming struts adapted to bear on the portion of the wire ring between said wings.

6. A clamp of the character described, comprising a split wire ring having overlapping ends, and a clamping means cooperating therewith, comprising a pair of relatively wide sections of substantially semi-circular shape having internal shallow wire receiving grooves, said sections having two of their ends pivotally connected together, the other ends being provided with outwardly extended portions or wings, said wings having inwardly extending portions extending at an angle to the wings, and forming struts adapted to bear on the portion of the wire ring between said wings, said struts having notches to receive said ring.

In testimony whereof, I affix my signature.

NORMAN ISACHSON.